July 9, 1963

R. R. ULRICH 3,097,303

PHOTOSENSITIVE OPTICAL TRIGGERING SCREEN

Filed Nov. 16, 1960

INVENTOR
Reinhard R. Ulrich

BY *S. J. Rotondi, A. J. Dupont, F. E. McGee & J. P. Edgerton*

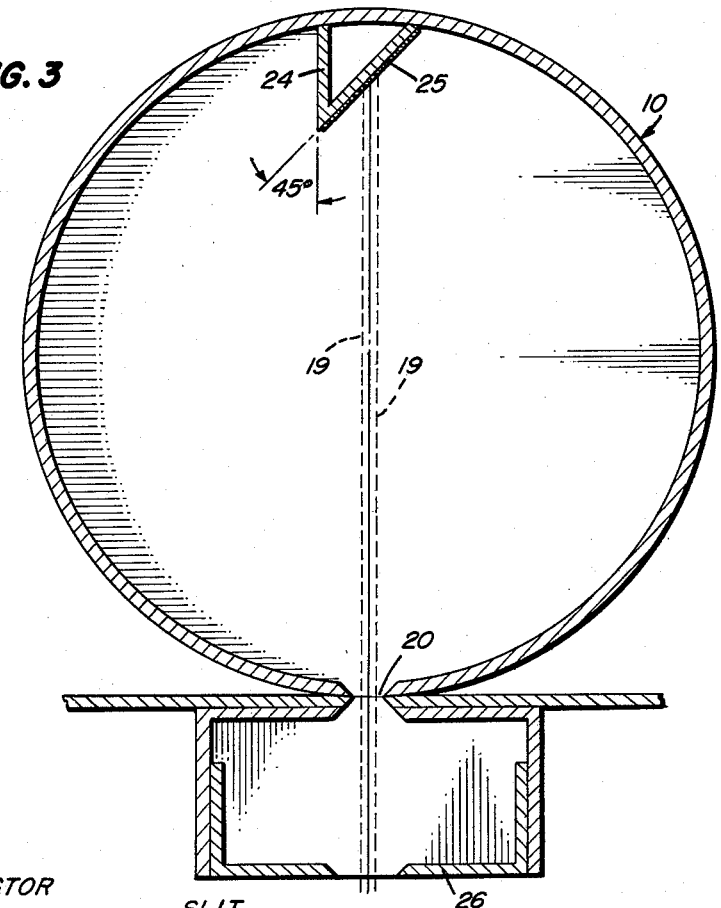
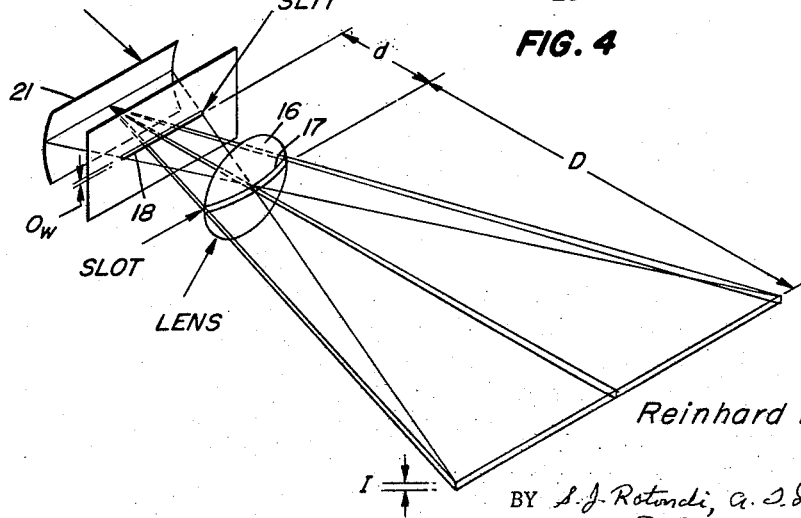

United States Patent Office

3,097,303
Patented July 9, 1963

3,097,303
PHOTOSENSITIVE OPTICAL TRIGGERING SCREEN
Reinhard R. Ulrich, Bethesda, Md., assignor to the United States of America as represented by the Secretary of the Army
Filed Nov. 16, 1960, Ser. No. 69,780
4 Claims. (Cl. 250—222)
(Granted under Title 35, U.S. Code (1952), sec. 266)

The invention described herein may be manufactured and used by or for the Government for governmental purposes without the payment to me of any royalty thereon.

This invention relates generally to the field of optical testing, and more specifically to an optical test device for accurately referencing, with respect to time and distance, a body traveling through space. A device of this nature is particularly well suited for application in the field of ballistics where studies of projectile trajectories are continually being conducted. Devices used for producing a signal pulse when a projectile passes through a predetermined portion of its trajectory are known as triggering screens.

In the past, triggering screens have been of two principal types—those requiring some sort of mechanical contact with the projectile and those requiring no mechanical contact. In the former category, for example, are devices consisting of two conducting surfaces separated by an insulator. A projectile passing through the two surfaces brings them into electrical contact with each other and thus produces a signal pulse. This type of screen, although useful in noncritical tests, suffers from obvious limitations and disadvantages. For example, it cannot be utilized in testing projectiles equipped with sensitive contact fuzes, a single test destroys the screen, and small flying debris and spark flashes are produced which could influence nearby test equipment.

In the second category of prior art triggering screens—those requiring no mechanical contact—perhaps the most typical is the magnetic coil induction type. As a magnetized projectile passes through a large coiled loop of wire, an induced signal is obtained. The accuracy of a position and time reference established by such a screen is directly dependent upon the projectile shape and symmetry of magnetization and is consequently diminished by these unstable characteristics.

It is therefore an object of this invention to provide a new and improved triggering screen which eliminates the aforementioned prior art shortcomings.

In order to achieve extreme accuracy and reliability, the triggering screen of the instant invention utilizes optical means to provide a detecting region bounded by two sharply defined parallel planes. In this screen, a photomultiplier tube normally looks into the darkness of a light-trapping cavity. However, when a projectile enters the detecting region light reflected from its surface will illuminate the tube, causing an output pulse to appear.

Therefore, it is a further object of this invention to provide a precise optical referencing device.

Another object of this invention is to provide an optical triggering screen in which the detecting region is bounded by two parallel planes.

Still another object of this invention is to utilize the light reflected from the surface of a projectile for providing an indication of its position at a specific point in its trajectory.

A further object is to develop a novel concept of optical detection wherein the detector ordinarily sees no light.

Other objects and advantages of this invention will be readily apparent from the following description considered together with the drawings in which:

FIG. 3 is an enlarged view of a possible modification of the light-trapping cavity depicted in FIGS. 1 and 2.

FIG. 4 is a three dimensional representation of the optical relationships in the apparatus of FIGS. 1 and 2.

Figure 1:
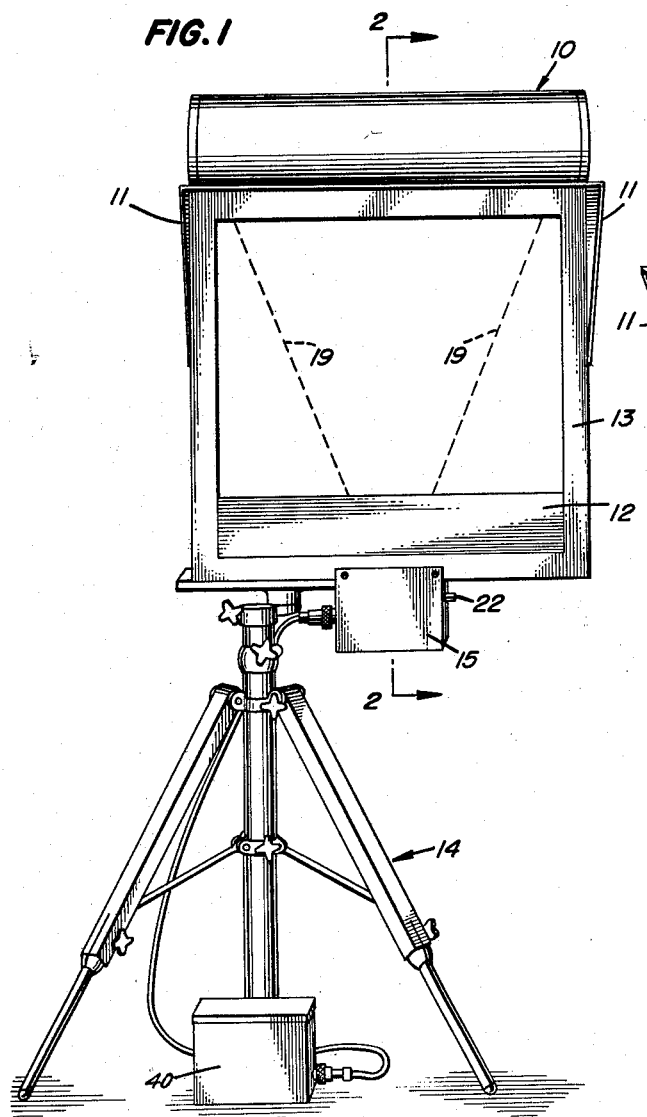
FIG. 1 is a front view of the triggering screen of the instant invention including a possible mounting arrangement.
Figure 2:
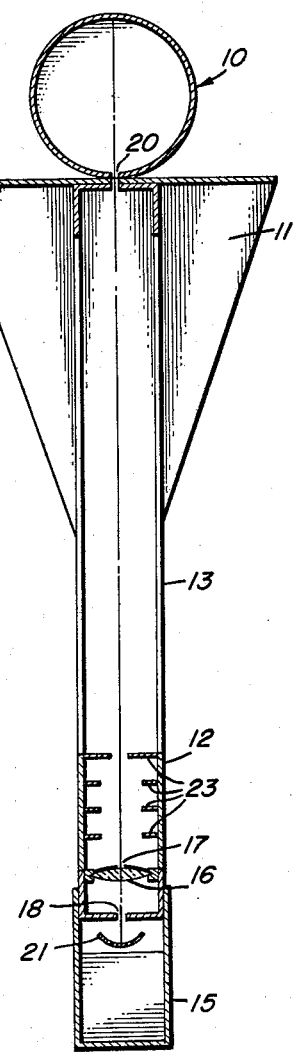
FIG. 2 is an enlarged sectional view taken through line 2—2 of FIG. 1 with the mounting apparatus omitted.

Referring now FIGS. 1 and 2, there is shown mounted upon conventional support means 14 the optical triggering screen of the instant invention. Frame 13 supports light-trapping cavity 10 which, in the preferred embodiment, is a hollow closed cylinder painted a dull black on the inside and having narrow slit 20 therein. Housing 15 contains a conventional photomultiplier tube having cathode 21 and output terminal 22 with lens 16 positioned between slit 20 and cathode 21. Lens 16 is masked off so as to provide narrow slot 17 along its face, which slot is aligned with slit 20 and slit 18 provided in housing 15. Sun shields 11 and 12 serve to prevent any extraneous light from falling upon lens 16 and photocathode 21. The shield 12 is composed of a series of dull black baffles 23 which further limit the amount of light which can enter the optical system. Disposed within case 40 is a standard power supply for the photomultiplier tube. As will be explained below, the foregoing arrangement of parts provides an optical detection region defined by the dotted lines 19 in FIG. 1.

In FIG. 3, an additional cavity 26 is disposed in front of slit 20 so as to make the region normally seen by cathode 21 even darker. There is additionally provided within cavity 10 a strip of dull black optical tape 25 mounted upon support 24 at an angle of 45° with the detection pattern so that the specular reflection of any ambient light entering the cavity will be confined therewithin. The uniform width of the detection pattern can be seen in FIG. 3 as defined by dotted lines 19.

The parallel boundaries of the detection pattern are obtained in accordance with the "quasi-parallel light principle" set forth in the patent application of Harald W. Straub, Serial No. 821,615, filed June 19, 1959, now Patent No. 3,001,079, for Optical Devices for Producing Parallel Beams.

Figure 5:
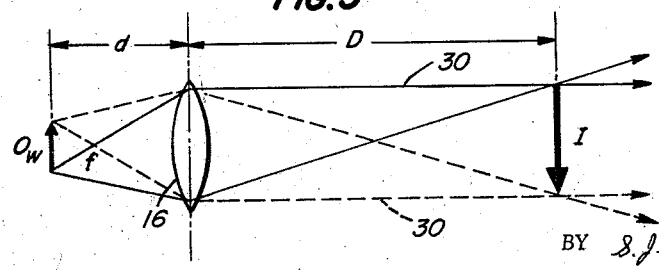
FIG. 5 is an optical diagram showing how a detection pattern of uniform thickness is obtained.

If it is desired to obtain a parallel beam defined by the lines 30 in FIG. 5, extending from the edges of lens 16 with a width I out to a distance D, the following procedure is followed:

It is assumed that at the distance D there is placed an object whose width is equal to the width of lens 16. An image, having a width $O_w$, of the object would therefore be formed a distance $d$ from the lens 16. The relationship among the various parameters can be found from the well known optical equations:

$$\frac{1}{f} = \frac{1}{d} + \frac{1}{D} \qquad (1)$$

and $$\frac{I}{O_w} = \frac{D}{d} \qquad (2)$$

where:
$O_w$ = diameter of detector aperture,
$I$ = diameter of quasi-parallel beam,
$D$ = length of the quasi-parallel beam,
$f$ = focal length of the lens,
$d$ = distance from detector aperture to the lens.

By eliminating $d$ from Equations 1 and 2

$$O_w = \frac{I}{\frac{D}{f}-1}$$

Thus, from the above equations it will be understood that if a light detector or light source having a width equal to $O_w$ is placed at a distance $d$ from the lens 16, the resulting light pattern or detection pattern will have purely parallel boundaries defined by the lines 30. Beyond the distance D it will be realized that the beam begins to diverge.

In FIG. 4, the application of the quasi-parallel light principle to the instant invention can be clearly seen. A fan-shaped pattern of uniform thickness is formed from the quasi-parallel beam by replacing the circular aperture of the detector by a slit having a width of $O_w$. The fan angle is determined by the length of the slit and by the $f$-number of the lens. The lens 16 is masked off to an effective slot aperture 17 equal to I, the desired thickness of the detection pattern. The minimum length of the slit for a predetermined length of light-trapping cavity slit 20 and distance D can be determined by simple geometry. Thus, it should be apparent that a uniform fan-shaped pattern of a length equal to the distance between the lens 16 and light-trapping cavity 10 and having a predetermined width can be obtained. The parameters of the optical system are adjusted so that the length of the detection pattern at the point where it enters light-trapping cavity 10 is slightly shorter than the length of slit 20, and the width I is slightly less than that of slit 20, in order to insure that the detection pattern terminates entirely within cavity 10.

In operation, photomultiplier cathode 21 normally "sees" only darkness due to the optical system described above and light-shielding means 11 and 12. When a projectile enters the detection region, daylight will be reflected from its surface onto photocathode 21, causing an output pulse to appear at terminal 22. High reliability in testing will be obtained because of the great sensitivity of the photomultiplier tube and the extreme accuracy of the detection pattern described above. If it is desired to perform tests at nighttime when there may not be enough light to produce a discernible reflection, an artificial light source may be directed from the ground through the detection region at the approximate height of the projectile trajectory. Of course, care must be exercised to insure that no direct light enters the cavity. It should be realized that detection patterns other than the fan-shaped one described herein can be utilized for particular applications by providing other slit and masking configurations. However, a uniform width would be essential in all such detection patterns. Similarly, the principles of the instant invention can be applied to other object detecting applications. While in the ballistic application described herein, typical values of 32 inches for D and 1/8 inch for I were employed, a detection pattern covering a much more extensive area could be obtained by increasing D and choosing a lens with the proper $f$-number. Although the sensitivity of such a system would not be as great as for smaller values of D, a discernible output would nevertheless be obtained from the photomultiplier tube for very large values of D.

I claim as my invention:

1. A system for providing a voltage output at the instant a projectile passes a predetermined point in space, comprising: a cylindrical light-trapping cavity having a narrow axial slit therein, a photomultiplier tube having a photocathode facing said axial slit, a lens masked off to a slot aperture whose width is approximately equal to the width of said axial slit, a housing having a slit therein whose width is equal to $O_w$, said lens and said photomultiplier tube being mounted within said housing so that said lens is positioned between said housing slit and said axial slit and said housing slit is positioned between said lens and said photocathode, said axial slit, said lens slot and said housing slit all being precisely aligned and said lens being positioned a distance $$d = \frac{O_w D}{I}$$

from said housing slit, where D is the distance from said axial slit to said lens and I is the width of said axial slit.

2. The invention set forth in claim 1, further including means for preventing any extraneous light from falling upon said photocathode.

3. The invention set forth in claim 2, wherein an additional light-trapping cavity is provided between said axial slit and said housing.

4. A system for providing an accurate indication of the precise instant a projectile passes a predetermined point in space, comprising: a cylindrical cavity whose interior is blackened having a narrow axial slit therein, a photomultiplier tube positioned so that its photocathode faces said slit, and means positioned between said cavity and said photocathode for confining the detection region of said photomultiplier to a fan-shaped volume of uniform thickness terminating within said cavity, and further including means disposed in said cavity for preventing ambient light entering said slit from emerging therefrom, wherein said means disposed in said cavity comprises a perforated strip of dull black optical tape having a surface disposed at an angle of 45 degrees to a line between said photocathode and said axial slit.

References Cited in the file of this patent

UNITED STATES PATENTS

| | | |
|---|---|---|
| 2,578,882 | Eash | Dec. 18, 1951 |
| 2,580,275 | Bickley | Dec. 25, 1951 |
| 2,803,754 | Cox | Aug. 20, 1957 |
| 2,967,947 | Flook | Jan. 10, 1961 |
| 3,025,406 | Stewart et al. | Mar. 13, 1962 |
| 3,041,461 | Lindemann et al. | June 26, 1962 |